US008416924B1

(12) United States Patent
Barth et al.

(10) Patent No.: US 8,416,924 B1
(45) Date of Patent: Apr. 9, 2013

(54) METHODS AND SYSTEMS FOR CUSTOMER DIRECTED ROUNDED PURCHASE AMOUNT INVESTMENTS

(75) Inventors: Ryan Ray Barth, San Antonio, TX (US); Ryan Todd Everett, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 435 days.

(21) Appl. No.: 11/548,169

(22) Filed: Oct. 10, 2006

(51) Int. Cl.
*G06Q 40/00* (2012.01)
(52) U.S. Cl. ............. 379/35; 705/14.1; 705/40; 705/45; 705/26
(58) Field of Classification Search ................ 705/10–45
See application file for complete search history.

(56) References Cited

U.S. PATENT DOCUMENTS

| | | | |
|---|---|---|---|
| 6,112,191 A | 8/2000 | Burke | |
| 6,119,099 A * | 9/2000 | Walker et al. | 705/16 |
| 6,164,533 A * | 12/2000 | Barton | 235/380 |
| 7,574,403 B2 * | 8/2009 | Webb et al. | 705/39 |
| 2003/0225649 A1 * | 12/2003 | Simpson | 705/35 |
| 2005/0075935 A1 * | 4/2005 | Walker et al. | 705/16 |
| 2005/0251485 A1 * | 11/2005 | Quigley | 705/53 |
| 2006/0122923 A1 * | 6/2006 | Burke | 705/35 |
| 2006/0242085 A1 * | 10/2006 | Jones et al. | 705/64 |
| 2007/0033134 A1 * | 2/2007 | Carretta et al. | 705/38 |
| 2007/0156579 A1 * | 7/2007 | Manesh | 705/39 |

OTHER PUBLICATIONS

"A whole new kind of change jar. Keep the Change", http://www.bankofamerica.com/promos/jump/ktc/?adlink=000302072g 350000c825, Oct. 4, 2006, pp. 1-2.
Chu, Kathy, "Some banks offer reward points for debit card use", http://usatoday.printthis.clickability.com/pt/cpt?action=cpt&title=USATODAY.com+-So..., Jun. 1, 2006, pp. 1-2.
Loeb, Marshall, "Savings Account Perk Programs Not All They're Hyped to Be", http://ww.foxnews.com/printer_friendly_story/0,3566,214664,00.html, Sep. 20, 2006, pp. 1-2.

* cited by examiner

*Primary Examiner* — Tien Nguyen
(74) *Attorney, Agent, or Firm* — Kilpatrick Townsend & Stockton LLP

(57) ABSTRACT

A customer-directed rounded-amount investment method includes determining whether a debit-card transaction is a qualifying transaction, determining whether the debit-card transaction is an odd-amount transaction and, if the transaction is an odd-amount qualifying transaction, crediting a customer-directed account in a rounded-difference amount.

18 Claims, 2 Drawing Sheets

METHODS AND SYSTEMS FOR CUSTOMER DIRECTED ROUNDED PURCHASE AMOUNT INVESTMENTS

CROSS-REFERENCE TO RELATED APPLICATIONS

This application is related to subject matter to, and incorporates by reference herein in its entirety, each of the following:

a U.S. patent application entitled METHODS AND SYSTEMS FOR INVESTMENT OF DEBIT-CARD WITHDRAWAL FEES, Ser. No. 11/539,929 and filed on the same date as this patent application; and a U.S. patent application entitled METHODS AND SYSTEMS OF PROVIDING INVESTMENT REWARDS BASED ON PURCHASES, Ser. No. 11/548,015 and filed on the same date as this patent application.

This patent application claims priority from U.S. Provisional Patent Application No. 60/830,942, entitled Method and Systems for Implementing an ATM and Debit Card Rebate Sweep and filed on Jul. 13, 2006.

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

1. Technical Field

Disclosed embodiments relate generally, by way of example and not limitation, to systems and methods that permit a financial-institution customer holding a debit card (i.e., cardholder) to direct rounded amounts of debit-card withdrawals for purchases or automatic teller machine (ATM) transactions to various accounts, including, but not limited to, the cardholder's savings accounts or investment accounts.

2. History of Related Art

In recent years, usage of debit cards has increased greatly. Debit cards are often used by financial-institution customers at both ATMs for cash withdrawals and to purchase goods or services, both online (i.e., via the Internet) and at traditional brick-and-mortar business establishments. Most debit cards allow cardholders to make purchases by using their debit card in similar fashion to a credit card by requiring the cardholder's signature at the time of purchase or by entering a personal identification number (PIN) in similar fashion to the manner in which the debit card may be used at an ATM.

In traditional cash-based transactions, consumers often purchase goods or services for amounts that do not total a whole-dollar amount (e.g., $1.14, $5.29, $10.42, or $37.96). In such cases, the consumer typically reaches the end of the day with a pocketful of change that is emptied into a jar or the like. In order to try to avoid such situations, consumers employ various strategies. For example, when purchasing gasoline, in order to reach a whole-dollar purchase amount, consumers often purchase more gasoline than the amount bought when a gas pump they are using initially shuts off. For example, if the gas pump stops at $28.91 worth of gasoline, a typical consumer pumps a bit more gasoline in order to reach the whole-dollar amount of $29.00. This practice avoids the need for the consumer to carry additional change for the remainder of the day and also reduces the amount of change that collects at their home or workplace, which change inevitably needs to be disposed of in some way.

Some disciplined consumers periodically collect the change that has accumulated from the result of non-whole-dollar cash transactions and direct this change towards an investment of some sort. However, such a practice takes a considerable amount of discipline and is also time-consuming. Moreover, as debit cards have become more widely used, the number of cash transactions a typical consumer is involved in, and consequently, the total amount of resulting change, have significantly decreased, making such a plan less advantageous to the consumer.

SUMMARY

This summary is not intended to represent each embodiment or every aspect; the following paragraphs of this summary provide representations of some embodiments as aspects thereof.

A customer-directed rounded-amount investment method includes determining whether a debit-card transaction is a qualifying transaction, determining whether the debit-card transaction is an odd-amount transaction and, if the transaction is an odd-amount qualifying transaction, crediting a customer-directed account in a rounded-difference amount.

A customer-directed rounded-amount investment system includes a processor adapted to determine whether a debit-card transaction is a qualifying transaction, determine whether the debit-card transaction is an odd-amount transaction and, if the transaction is an odd-amount qualifying transaction, credit a customer-directed account in a rounded-difference amount. The customer-directed rounded-amount investment system also includes a memory interoperably coupled to the processor.

An article of manufacture for customer-directed rounded-amount investing includes at least one computer readable medium and processor instructions contained on the at least one computer readable medium. The processor instructions are configured to be readable from the at least one computer readable medium by at least one processor and thereby cause the at least one processor to operate as to determine whether a debit-card transaction is a qualifying transaction, determine whether the debit-card transaction is an odd-amount transaction, and if the transaction is an odd-amount qualifying transaction, credit a customer-directed account in a rounded-difference amount.

BRIEF DESCRIPTION OF THE DRAWINGS

A more complete understanding of the methods and systems as set forth herein may be obtained by reference to the following Detailed Description when taken in conjunction with the accompanying Drawings wherein.

DETAILED DESCRIPTION

Methods and systems will now be described more fully with reference to the accompanying drawings in which various embodiment(s) are shown. The methods and systems may, however, be embodied in many different forms and should not be construed as limited to the embodiments set forth herein; rather, these embodiments are provided so that this disclosure will be thorough and complete, and will fully convey the scope of the systems and methods to those skilled in the art.

Figure 1:
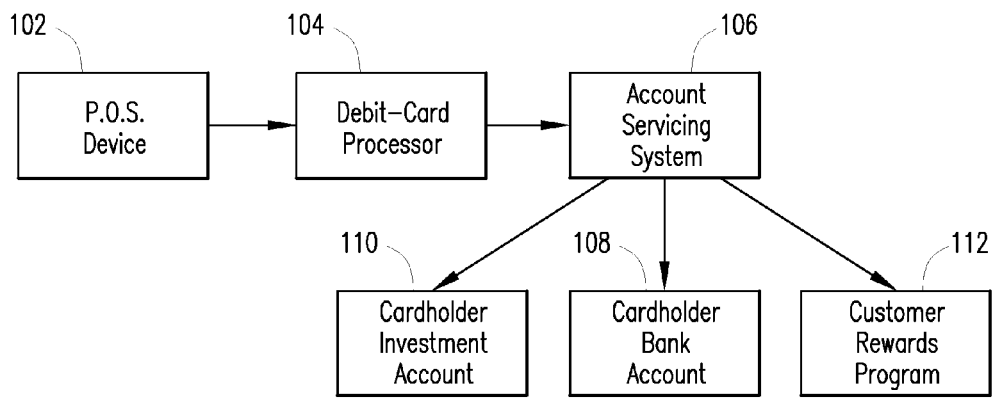
FIG. 1 is a block diagram of a debit-card financial-processing network.

FIG. 1 is a block diagram of a debit-card financial-processing network. A debit-card financial-processing network 100 includes a point-of-sale device (e.g., an ATM, an internet-enabled computer, or a device at a brick-and-mortar business establishment) 102 interoperably connected to a debit-card processor 104. The debit-card processor 104 is interoperably connected an account servicing system 106. The account servicing system 106, which may be operated, for example, by FIDELITY, is interoperably connected to a cardholder account 108 at a bank or other financial institution, a cardholder investment account 110, and a customer rewards program 112. The customer rewards program 112 may, for example, be a rewards program administered by AFFINION LOYALTY GROUP (ALG). The debit-card processor 104 may, for example, be operated by MASTERCARD and take the form of a MASTERCARD DEBIT SWITCH (MDS). Of course, those having skill in the art will appreciate that this is not the only possible implementation of the debit-card processor 104 and that other implementations may be used without departing from the innovative principles described herein. The debit-card processor 104 may be part of an ATM network, such as, for example, those operated by STAR or PULSE.

In typical operation of the debit-card financial-processing network 100, a customer seeks to make a purchase using the point-of-sale device 102. For purposes of this patent application, the term purchase includes both transactions by which a good or service is purchased and funds withdrawals, for example, at an ATM.

The debit-card processor 104 serves as an intermediary between the point-of-sale device 102 and the account servicing system 106. In a typical arrangement, the account servicing system 106 performs tasks related to purchases by the customer at the point-of-sale device 102, such as authorizations and determinations whether adequate funds are present in the customer's account to make the purchase at the point-of-sale device 102.

In a typical embodiment, the account servicing system 106 performs tasks associated with authorizing the transaction (e.g., a purchase of goods or services) by the customer at the point-of-sale device 102. For example, the account servicing system 106 may check available funds in the customer's account and perform other necessary tasks to authorize the transaction. As part of the tasks performed by the account servicing system 106, the account servicing system 106 typically communicates with the cardholder account 108 at the cardholder's bank or other financial institution, for example, to verify that sufficient funds are available in the cardholder account 108 to complete the transaction at the point-of-sale device 102.

Following authorization of the transaction by the account servicing system 106, approval of the transaction is provided by the account servicing system 106 via the debit-card processor 104 to the point-of-sale device 102. In the case of a cash withdrawal at an ATM, the requested funds are disbursed by the point-of-sale device 102 to the cardholder. In addition, the account servicing system 106 communicates with the cardholder account 108 and appropriate debit(s) are made to the cardholder account 108 in light of the transaction at the point-of-sale device 102.

One or more of the cardholder account 108, the cardholder investment account 110, and the customer rewards program 112 may be resident on the account servicing system 106 or may instead reside on a separate system from the account servicing system 106. For example, the cardholder's bank or other financial institution may outsource certain services to a third-party vendor, which outsourcing is typically transparent to the cardholder. As an example, the cardholder account 108 and the customer rewards program 112 may be resident on the account servicing system 106, the account servicing system 106 being administered by a third-party vendor with which the cardholder's bank or other financial institution contracts. As another example, the cardholder investment account 110 may reside on a separate system from the accounting servicing system 106.

In various embodiments of the innovative methods and systems set forth herein, the network 100 may be used to allow a cardholder to round purchase amounts up according to predetermined criteria and direct the difference between an actual purchase price and the rounded-up amount to an account of the customer's choosing, such arrangements being referred to herein as rounding-up programs. For purposes of this patent application, the difference between an actual purchase price and the rounded-up amount is referred to as a rounded-up difference amount. For example, the customer may set debit-card purchase preferences so that transactions are rounded-up to a nearest whole-dollar amount.

The customer's preferences may also dictate that rounded-up difference amounts be directed, for example, to a particular investment account, bank or other financial-institution account, or customer rewards program. Those having skill in the art will appreciate that such investment accounts (e.g., the cardholder investment account 110) can include money-market accounts or brokerage accounts. In similar fashion, the bank or other financial-institution accounts of the customer (e.g., the cardholder bank account 108) may include various savings or checking accounts of the customer. Further, the customer rewards program 112 may, for example, be points-based, miles-based, or cash-back-based programs, as described in more detail in a U.S. patent application entitled METHODS AND SYSTEMS OF PROVIDING INVESTMENT REWARDS BASED ON PURCHASES, Ser. No. 11/548,015 (Applicant Reference No. US-0125) and filed on the same date as this patent application.

Assuming that the customer has directed that all debit-card purchases be rounded up to the nearest whole dollar and that the rounded-up difference amount be directed to the customer's brokerage account, if the customer purchases $25.43 in groceries using the debit card, 57¢ (i.e., the rounded-up difference amount) is directed automatically to the customer's brokerage account. The rounded-up difference amount can be made available to the customer essentially in real-time, on a daily basis, or based upon some other interval as desired. For purposes of this patent application, the term real time is defined to mean a time period necessary for system processing to occur without any non-system-processing-related delays being added thereto. Those having skill in the art will appreciate that the interval, if any, at which the rounded-up difference amounts are posted to the customer's desired account can be varied without departing from principles of the methods and systems set forth herein.

In some embodiments, the debit-card issuer may place further restrictions upon the cardholder's participation in a rounding-up program in order to influence cardholder behavior. For example, it may be advantageous to the debit-card issuer (i.e., the customer's bank or other financial institution) to limit the rounding-up program to signature-based purchases only. In such an example, transactions using the debit card in which the customer enters a personal identification number (PIN) would not be eligible for the rounding-up program. Moreover, the debit-card issuer may wish to incentivize the customer to use certain merchants and may therefore offer the rounding-up program at some merchants and not at others.

In an example of pre-defined customer rounding-up program preferences, the customer may choose to have all purchases of less than $10.00 rounded up to the nearest whole dollar, while all purchases in excess of $100.00 are rounded to the nearest multiple of $10.00. In such a case, a $17.92 purchase would be rounded up to $18.00 and the 8¢ difference deposited into an account according to the customer's pre-defined preferences, while a $221.00 purchase would be rounded up to $230.00 and $9.00 directed into the account according to the customer's predefined preferences. Further, in some embodiments, rounded-up amounts of different amounts may, for example, be directed to different accounts as pre-defined by the customer.

Transaction codes are typically used by the account servicing system 106 for the actual purchase and for the rounded-up difference amount. In this way, the actual purchase price amount withdrawn from the cardholder account via the point-of-sale device 102 and the rounded-up difference amount can be easily distinguished from one another. In a typical embodiment, the debits to the cardholder account 108 remain in separate categories according to transaction code during a statement cycle and post to the cardholder account 108 on a real-time or daily basis; in contrast, at the end of the statement cycle, the account servicing system 106 typically posts credits corresponding to the rounded-up difference amounts to account(s) pre-defined by the customer to receive the rounded-up difference amounts.

The transaction codes may be used to segregate the rounded-up difference amounts from the actual purchase amounts by the account servicing system 106. The account servicing system segregates the actual-purchase amounts from the rounded-up difference amounts so that the rounded-up difference amounts may be credited to the account pre-defined by the customer. Segregation of the actual-purchase amount and the rounded-up difference amount for each transaction into separate transaction-code categories also permits the account servicing system 106 to post the actual-purchase amount and the rounded-up difference amount for a given transaction as separate line-item debits to the account from which debit-card transactions are drawn for the customer. For example, if a $3.93 actual-purchase-amount transaction is conducted by the customer using the customer's debit card at a TARGET store, the customer has directed that all qualifying debit-card transactions be rounded up to the nearest whole dollar and directed to the customer's brokerage account, and debit-card purchases are tied to the customer's checking account, this transaction would result in two separate line-item debits to the customer's checking account, one in the amount of $3.93, a second in the amount of 7¢, and would also result in a credit to the customer's brokerage account in the amount of 7¢.

While the debits to the account of the customer tied to the customer's debit card are typically posted on a real-time, or at least daily, basis in order to allow the customer to separately keep track of the full amounts (i.e., actual-purchase amounts plus rounded-up difference amounts) made to their debit-card accounts, posting of credits to the account to which roundup-difference amounts are directed may be set to occur at a longer interval, such as, for example, at the conclusion of a statement building cycle. Such a practice may provide the debit-card issuer with use of the rounded-up difference amounts during the balance of the statement billing cycle and also serve to reduce costs associated with maintaining the rounding-up program.

In some systems, withdrawal fees charged by ATMs, such as, for example, the point-of-sale device 102, are refunded by the cardholder's bank or other financial institution and are credited to a checking account of the cardholder at the cardholder's bank or other financial institution. For example, if the cardholder account 108 at the cardholder's bank or other financial institution is the cardholder's checking account, the cardholder account 108 could be credited in the amount of the withdrawal fee charged by the point-of-sale device 102. In this way, banks or other financial institutions that do not have their own ATMs can give their customers access to a wide range of ATMs without having to incur the costs of establishing and maintaining those ATMs themselves. Those having skill in the art will appreciate that principles in accordance with the innovations disclosed herein can be readily combined with such withdrawal-fee refund programs.

Figure 2:
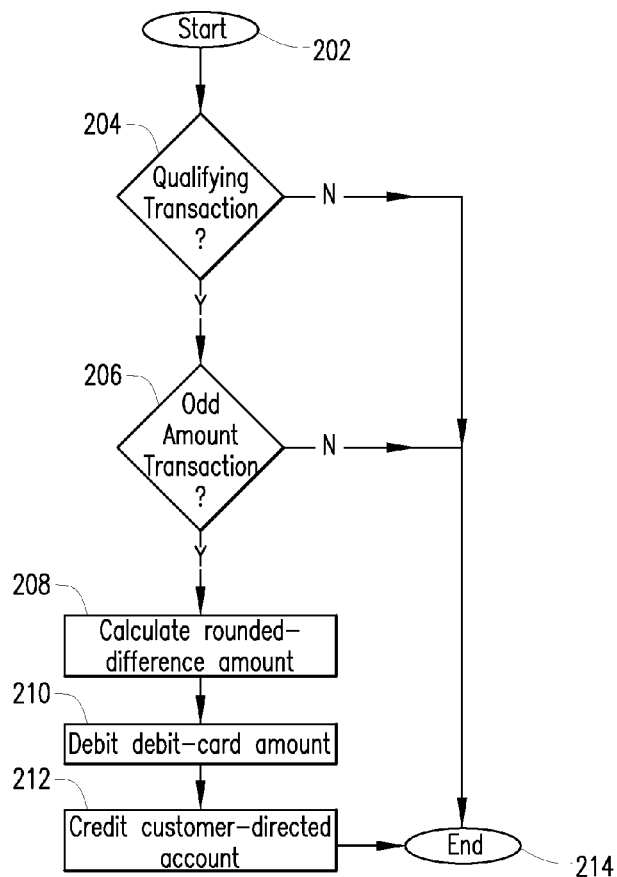
FIG. 2 is a flow diagram illustrating operation of an account servicing system.

FIG. 2 is a flow diagram illustrating operation of an account servicing system. In FIG. 2, a process flow 200 begins at step 202. From step 202, execution proceeds to step 204. At step 204, a determination is made by the account servicing system 106 regarding whether a debit-card transaction being conducted via the point-of-sale device 102 is a qualifying transaction. For example, in some embodiments, signature-based debit-card transactions may be considered qualifying transactions that are eligible for participation in a rounding program, while PIN-based debit-card transactions are not eligible for the rounding program.

If, at step 204, it is determined that the transaction is a qualifying transaction, execution proceeds to step 206. At step 206, a determination is made regarding whether the transaction is an odd-amount transaction. For purposes of this patent application, an odd-amount transaction is a transaction that involves a purchase amount that may be rounded in accordance with the rounding program. For example, if non-whole-dollar amounts are to be rounded to the nearest whole dollar, any non-whole-dollar purchase amounts are considered odd-amount transactions. In similar fashion, as in the example above regarding purchase amounts in excess of $100.00, a purchase amount of $221.00 would be considered an odd amount, because, in that example, purchase amounts in excess of $100.00 are rounded to the nearest ten-dollar amount. If, at step 206, it is determined that the transaction is an odd-amount transaction, execution proceeds to step 208.

At step 208, a rounded-difference amount is calculated. From step 208, execution proceeds to step 210. At step 210, the debit-card account (i.e., the customer account form which debit-card purchase are debited) is debited in both the rounded-difference amount and the actual-purchase amount, each of the debits being associated with a different transaction code and appearing in records pertaining to the debit-card account as separate line items.

From step 210, execution proceeds to step 212. At step 212, a customer-directed account (i.e., an account pre-defined by the customer to which rounded-difference amounts are to be directed) is credited in the amount of the rounded-differenced amount. Those having skill in the art will appreciate that step 212 may be performed in real-time, on a daily basis, or at some other interval. In cases in which step 212 is performed at a pre-defined interval, such as, for example, in accordance with a statement cycle, step 210 may be performed a plurality of times prior to step 212 being performed at the conclusion of the statement cycle.

From step 212, execution proceeds to step 214. In addition, if the determinations of steps 204 or 206 are negative, execution proceeds to step 214. At step 214, execution of the process 200 ends.

Figure 3:
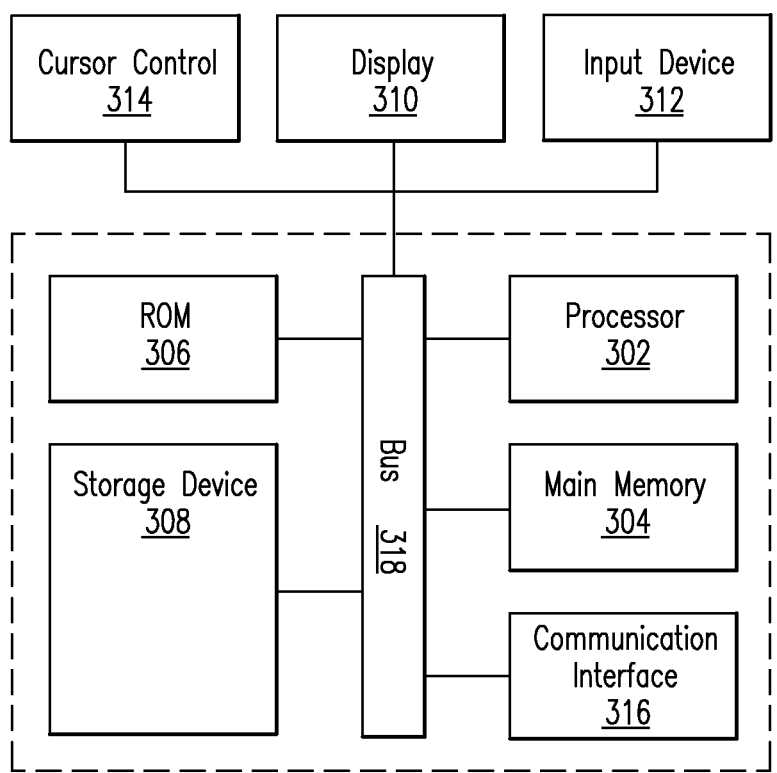
FIG. 3 illustrates an embodiment of a server that may be employed to carry out various processes in accordance with the innovations described herein.

FIG. 3 illustrates an embodiment of a server that may be employed to carry out various processes in accordance with the innovations described herein. In the implementation shown, a server 300 may include a bus 318 or other communication mechanism for communicating information and a processor 302 coupled to the bus 318 for processing information. The server 300 also includes a main memory 304, such as a random access memory (RAM) or other dynamic storage device, coupled to the bus 318 for storing computer readable instructions to be executed by the processor 302.

The main memory 304 also may be used for storing temporary variables or other intermediate information during execution of the instructions to be executed by the processor 302. The server 300 further includes a read only memory (ROM) 306 or other static storage device coupled to the bus 318 for storing static information and instructions for the processor 302. A computer readable storage device 308, such as a magnetic disk or optical disk, is coupled to the bus 318 for storing information and instructions for the processor 302.

The server 300 may be coupled via the bus 318 to a display 310, such as a cathode ray tube (CRT), for displaying information to a user. An input device 312, including, for example, alphanumeric and other keys, is coupled to the bus 318 for communicating information and command selections to the processor 302. Another type of user input device is a cursor control 314, such as a mouse, a trackball, or cursor direction keys for communicating direction information and command selections to the processor 302 and for controlling cursor movement on the display 310. The cursor control 314 typically has two degrees of freedom in two axes, a first axis (e.g., x) and a second axis (e.g., y), that allow the device to specify positions in a plane.

The term "computer readable instructions" as used above refers to any instructions that may be performed by the processor 302 and/or other component of the server 300. Similarly, the term "computer readable medium" refers to any storage medium that may be used to store the computer readable instructions. Such a medium may take many forms, including, but not limited to, non volatile media, volatile media, and transmission media. Non volatile media may include, for example, optical or magnetic disks, such as the storage device 308. Volatile media may include dynamic memory, such as main memory 304. Transmission media may include coaxial cables, copper wire and fiber optics, including wires of the bus 318. Transmission can take the form of acoustic or light waves, such as those generated during radio frequency (RF) and infrared (IR) data communications. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

Various forms of the computer readable media may be involved in carrying one or more sequences of one or more instructions to the processor 302 for execution. For example, the instructions may initially be borne on a magnetic disk of a remote computer. The remote computer can load the instructions into its dynamic memory and send the instructions over a telephone line using a modem. A modem local to the server 300 can receive the data on the telephone line and use an infrared transmitter to convert the data to an infrared signal. An infrared detector coupled to the bus 318 can receive the data carried in the infrared signal and place the data on the bus 318. The bus 318 carries the data to the main memory 304, from which the processor 302 retrieves and executes the instructions. The instructions received by the main memory 304 may optionally be stored on the storage device 308 either before or after execution by the processor 302.

The server 300 may also include a communication interface 316 coupled to the bus 318. The communication interface 316 provides a two way data communication coupling between the server 300 and a network, such as the network of FIG. 1. For example, the communication interface 316 may be an integrated services digital network (ISDN) card or a modem used to provide a data communication connection to a corresponding type of telephone line. As another example, the communication interface 316 may be a local area network (LAN) card used to provide a data communication connection to a compatible LAN. Wireless links may also be implemented. In any such implementation, the communication interface 316 sends and receives electrical, electromagnetic, optical, or other signals that carry digital data streams representing various types of information.

The storage device 308 can further include instructions for carrying out various processes for customer-directed rounded-purchase-amount investments described herein when executed by the processor 302. The storage device 308 can further include a database for storing data related to customer-directed rounded-purchase-amount investments.

The methods and systems set forth herein can be combined with debit-card cash-back programs as desired by the debit-card issuer. For example, in such cash-back programs, a percentage of purchases made using the debit card is automatically rewarded to the customer. A typical reward percentage for such programs is 0.5%. Cash-back rewards of this type can be set according to customer preferences to be directed to a particular account in similar fashion to the customer preferences described above in which rounded-up difference amounts for debit-card purchases are directed to particular accounts.

The previous description is of embodiment(s) for implementing the methods and systems described herein, and the scope should not be limited by this description. The scope is instead defined by the following claims

What is claimed is:

1. A customer-directed rounded-amount investment method comprising:
   determining by at least one computer processor whether a debit-card transaction is a signature-based transaction, wherein the debit card is connected to a debit card account;
   in response to determining that the debit-card transaction is a signature-based transaction, determining by the at least one computer processor whether the debit-card transaction is an odd-amount transaction;
   in response to determining that the debit-card transaction is an odd-amount transaction and the debit-card transaction is a signature-based transaction, determining a rounding target based on a comparison between a purchase price associated with the debit-card transaction and a customer-chosen whole dollar amount;
   wherein determining a rounding target further comprises:
      in response to determining that the purchase price is less than the customer-chosen whole dollar amount, determining a rounding target of one dollar, and in response to determining that the purchase price is greater than or equal to the customer-chosen whole dollar amount, determining a rounding target of ten dollars;

debiting a total debit amount from the debit card account wherein the total debit amount is the purchase price rounded up to the nearest rounding target;

crediting by the at least one computer processor a rounded difference amount to a customer-directed account, wherein the rounded difference amount is based at least on the purchase price and the total debit amount.

2. The method of claim 1, wherein the consumer-directed account is selected from the group consisting of a brokerage account, a savings account, and a customer rewards program account.

3. The method of claim 1, further comprising debiting a customer debit-card account in the rounded-difference amount and in an actual purchase amount.

4. The method of claim 3, wherein the debiting step is performed in real-time.

5. The method of claim 1, wherein the step of determining whether the debit-card transaction is an odd-amount transaction is dependent on pre-defined customer rounding preferences.

6. The method of claim 1, wherein the crediting step is performed in accordance with an account statement cycle.

7. A consumer-directed rounded-amount investment system comprising:
a processor; and
a memory disposed in communication with the processor and storing processor-executable instructions, the instructions comprising instructions to:
determine whether a debit-card transaction that is connected to a debit card account is a signature-based transaction;
determine whether the debit-card transaction is an odd-amount transaction in response to determining that the debit-card transaction is a signature-based transaction;
in response to determining that debit-card transaction is an odd-amount transaction and the debit-card transaction is a signature-based transaction, determine a rounding target based on a comparison between a purchase price associated with the debit-card transaction and a customer-chosen whole dollar amount;
wherein determining a rounding target further comprises instructions to:
in response to determining that the purchase price is less than the customer-chosen whole dollar amount, determine a rounding target of one dollar, and
in response to determining that the purchase price is greater than or equal to the customer-chosen whole dollar amount, determine a rounding target of ten dollars;
debit a total debit amount from the debit card account, wherein the total debit amount is the purchase price rounded up to the nearest rounding target;
credit a rounded difference amount to a customer-directed account;
wherein the rounded difference amount is based at least on the purchase price and the total debit amount.

8. The system of claim 7, wherein the consumer-directed account is selected from the group consisting of a brokerage account, a savings account, and a customer rewards program account.

9. The system of claim 7, wherein the processor is further adapted to debit a customer debit-card account in the rounded-difference amount and in an actual purchase amount.

10. The system of claim 9, wherein the debit is performed in real-time.

11. The system of claim 7, wherein the determination of whether the debit-card transaction is an odd-amount transaction is dependent on pre-defined customer rounding preferences.

12. The system of claim 7, wherein the credit is performed in accordance with an account statement cycle.

13. An article of manufacture for customer-directed rounded-amount investing, the article of manufacture comprising:
at least one computer readable medium;
processor instructions contained on the at least one computer readable medium, the processor instructions configured to be readable from the at least one computer readable medium by at least one processor and thereby cause the at least one processor to operate as to:
determine whether a debit-card transaction that is connected to a debit card account is a signature-based transaction;
determine whether the debit-card transaction is an odd-amount transaction in response to determining that the debit-card transaction is a signature-based transaction;
in response to determining that the purchase price is an odd amount and the debit-card transaction is a signature-based transaction, determine a rounding target based on a comparison between the purchase price and a customer-chosen whole dollar amount;
wherein determining a rounding target further comprises instructions that cause the processor to operate as to:
in response to determining that the purchase price is less than the customer-chosen whole dollar amount, determine a rounding target of one dollar, and
in response to determining that the purchase price is greater than or equal to the customer-chosen whole dollar amount, determine a rounding target of ten dollars;
debit a total debit amount from the debit card account, wherein the total debit amount is the purchase price rounded up to the nearest rounding target;
credit a rounded difference amount to a customer-directed account;
wherein the rounded difference amount is based at least on the purchase price and the total debit amount.

14. The article of manufacture of claim 13, wherein the consumer-directed account is selected from the group consisting of a brokerage account, a savings account, and a customer rewards program account.

15. The article of manufacture of claim 13, wherein the processor instructions are configured to cause the at least one processor to operate as to debit a customer debit-card account in the rounded-difference amount and in an actual purchase amount.

16. The article of manufacture of claim 15, wherein the debit is performed in real-time.

17. The article of manufacture of claim 13, wherein the determination of whether the debit-card transaction is an odd-amount transaction is dependent on pre-defined customer rounding preferences.

18. The article of manufacture of claim 13, wherein the credit is performed in accordance with an account statement cycle.

* * * * *